(12) United States Patent
Baba et al.

(10) Patent No.: US 7,692,123 B2
(45) Date of Patent: Apr. 6, 2010

(54) MANUFACTURING MACHINE FOR MANUFACTURING HEAT-SOURCE ROD AND METHOD OF MANUFACTURING SAME

(75) Inventors: Yasuo Baba, Tokyo (JP); Hajime Ohinata, Ibaraki (JP); Nobuo Hosoya, Mooka (JP); Toshio Yanagi, Sendai (JP)

(73) Assignee: Japan Tobacco Inc., Tokyo (JP)

( * ) Notice: Subject to any disclaimer, the term of this patent is extended or adjusted under 35 U.S.C. 154(b) by 416 days.

(21) Appl. No.: 11/790,247

(22) Filed: Apr. 24, 2007

(65) Prior Publication Data

US 2007/0193593 A1    Aug. 23, 2007

Related U.S. Application Data

(63) Continuation of application No. PCT/JP2005/019015, filed on Oct. 17, 2005.

(30) Foreign Application Priority Data

Oct. 25, 2004    (JP) .............................. 2004-309743

(51) Int. Cl.
*H05B 3/34*    (2006.01)
*A24D 1/02*    (2006.01)

(52) U.S. Cl. ...................... 219/545; 131/365

(58) Field of Classification Search ......... 219/542–548; 131/194, 365, 375, 77, 78, 84.1–84.4
See application file for complete search history.

(56) References Cited

U.S. PATENT DOCUMENTS 3,193,406 A  *  7/1965  Mittelman ................... 427/348
5,065,776 A     11/1991  Lawson et al.
5,076,297 A     12/1991  Farrier et al.
5,727,571 A  *  3/1998  Meiring et al. .............. 131/194

FOREIGN PATENT DOCUMENTS

| EP | 0 340 808 A2 | 11/1989 |
| JP | 6-7139 A | 1/1994 |
| JP | 6-77606 A | 10/1994 |
| JP | 3472591 B | 9/2003 |

(Continued)

*Primary Examiner*—Sang Y Paik
(74) *Attorney, Agent, or Firm*—Birch, Stewart, Kolasch & Birch, LLP (57) ABSTRACT

A manufacturing machine manufactures a heat-source rod having a rod-like extrusion-molded article made from a combustible material with axial grooves in the cylindrical surface thereof and a heat-insulating web enveloping the article, and is provided with a apparatus 10 for spouting water to the web W in the process of the web W being fed to a wrapping section 4. The spout apparatus 10 includes an air vibrator 12 with a vibrating rod 34, and a flexible nozzle 36 attached to the rod 34 to extend across the rod 34 and supplied with water from a rate regulating pump 42. While the web W is being fed, the end of the nozzle 36 spouts water to the web W, reciprocating widthways relative to the web W due to vibration of the rod 34, and the water spouted dissolves a binder used in the web W to bind heat-insulating fiber, thereby forming a wet band H, where the wet band H has a waveform continuing along the longitudinal direction of the web W and provides a adhesive region for bonding the article.

7 Claims, 6 Drawing Sheets

FOREIGN PATENT DOCUMENTS

| | | |
|---|---|---|
| RU | 1836038 A3 | 8/1993 |
| RU | 2 097 997 C1 | 12/1997 |
| UA | 49831 C2 | 10/2002 |
| UA | 53621 C2 | 2/2003 |
| UA | 80109 C2 | 8/2007 |
| UA | 80784 C2 | 10/2007 |

* cited by examiner

MANUFACTURING MACHINE FOR MANUFACTURING HEAT-SOURCE ROD AND METHOD OF MANUFACTURING SAME

This application is a Continuation of copending PCT International Application No. PCT/JP2005/019015 filed on Oct. 17, 2005, which designated the United States, and on which priority is claimed under 35 U.S.C. §120. This application also claims priority under 35 U.S.C. §119(a) on Patent Application No(s). 2004-309743 filed in Japan on Oct. 25, 2004. The entire contents of each of the above documents is hereby incorporated by reference.

TECHNICAL FIELD

This invention relates to a manufacturing machine for manufacturing a heat-source rod for a heat-source chip, namely, a heat-source rod for obtaining a heat-source chip for use in a smoking article substituting for a cigarette, and a method of manufacturing the same.

BACKGROUND ART

The heat-source chip as mentioned above is obtained by cutting a continuous heat-source rod into a specified length. As shown in the specification of Japanese Patent No. 3472591, for example, the heat-source rod comprises an extrusion-molded article obtained by extrusion-molding a combustible fuel material into a rod-like shape, and a heat-insulating web wrapped around the extrusion-molded article. The heat-insulating web is made of glass fiber.

More specifically, the extrusion-molded article is fed to a wrapping section immediately after made, and therefore still in a wet or soft state, continuously wrapped in the heat-insulating web at the wrapping section and thereby formed into a heat-source rod. Then, the heat-source rod is fed to a cutting section, and at the cutting section, cut into a specified length, so that the above-mentioned heat-source chip is obtained. Thus, the heat-source chip comprises a fuel core formed from part of the extrusion-molded article, and a heat-insulating sheath formed from part of the heat-insulating web and enveloping the fuel core. The heat-source chip is then combined with other constituent elements so that the heat-source chip and other constituent elements form a substitute smoking article similar to a cigarette.

The heat-source chip, or more exactly, the extrusion-molded article needs to have burning characteristics suitable for the substitute smoking article. In this view, the extrusion-molded article has a through-hole formed in the center thereof, and a plurality of axial grooves formed in the cylindrical surface thereof. The axial grooves are arranged at equal intervals in the circumferential direction of the extrusion-molded article.

Meanwhile, the heat-insulating sheath of the heat-source chip needs to securely envelop the heat-source core and prevent the heat-source core from falling off the substitute smoking article. Thus, the manufacturing machine disclosed in the above-mentioned patent document includes a distribution roller. The distribution roller is disposed upstream of the wrapping section, and applies water onto the heat-insulating web as a bonding inducing agent before the heat-insulating web is fed to the wrapping section. The water applied dissolves pectin used in the heat-insulating web as a binder, and the pectin dissolved functions as an adhesive for bonding the extrusion-molded article and the heat-insulating web together. Specifically, the distribution roller applies water onto the heat-insulating web in the form of a streak extending along the longitudinal direction of the heat-insulating web, so that pectin dissolved forms a glue rail on the heat-insulating web.

As mentioned above, the extrusion-molded article has a plurality of axial grooves in the cylindrical surface. Thus, when the extrusion-molded article is wrapped in the heat-insulating web in the wrapping section, the glue rail on the heat-insulating web may coincide with one of the axial grooves. In this case, the glue rail is not in contact with the cylindrical surface of the extrusion-molded article and therefore does not effectively function as an adhesive for bonding the extrusion-molded article and the heat-insulating web together.

If a heat-source chip is obtained from a heat-source rod manufactured this way, the heat-source chip is defective with insufficient bonding between the fuel core and the heat-insulating sheath, and a substitute smoking article with such heat-source chip incorporated is also defective. If a shock is applied to such defective substitute smoking article in the axial direction during transportation or when it is held in a consumer's hand, the shock may cause axial shift of the fuel core of the heat-source chip. As a result of such axial shift, the fuel core protrudes from an end of the heat-insulating sheath, namely an end of the substitute smoking article, or plunges toward the constituent element adjacent to the heat-source chip within the substitute smoking article. Such protrusion or plunge of the fuel core makes the smoking of the substitute smoking article difficult.

In order to avoid this problem, it is conceivable to increase the number of glue rails formed on the heat-insulating web, or increase the width of the glue rail. In either case, however, a large amount of water is applied onto the heat-insulating web, so that an increased amount of water penetrates into the cylindrical surface of the extrusion-molded article, which decreases the hardness of the outer surface of the extrusion-molded article to a great degree.

When fed to the wrapping section, the extrusion-molded article is still in a wet and soft state and therefore contains a large amount of water. If, in addition to this water contained, a large amount of water penetrates into the extrusion-molded article from the heat-insulating web, the extrusion-molded article cannot maintain the external shape thereof. Thus, when the extrusion-molded article is wrapped in the heat-insulating web or when the heat-source rod is cut, the axial grooves of the extrusion-molded article may be deformed, or crushed and blocked. Deforming or crushing the axial grooves like this reduces the flow-passage cross-sectional area of the axial grooves to a great degree, so that the heat-source chip cannot have burning characteristics required.

The primary object of this invention is to provide a manufacturing machine and manufacturing method capable of ensuring sufficient strength of bonding between the extrusion-molded article and the heat-insulating web and imparting desired burning characteristics to the heat-source rod, and therefore, to the heat-source chip.

DISCLOSURE OF THE INVENTION

In order to achieve this object, a manufacturing machine for manufacturing a heat-source rod according to the present invention comprises a web path for feeding a heat-insulating web made of heat-insulating fiber bound by a binder; a wrapping section disposed downstream of the web path, for receiving the heat-insulating web from the web path and a rod-like extrusion-molded article made from a combustible material with a plurality of axial grooves in a cylindrical surface thereof on one side of the received heat-insulating web, and continuously wrapping the extrusion-molded article in the heat-insulating web, thereby forming a heat-source rod, while the heat-insulating web and the extrusion-molded article are passing through the wrapping section; and a solvent spout apparatus for spouting a solvent for dissolving the binder onto said side of the heat-insulating web, thereby forming a wet band of the solvent on said side of the heat-insulating web, before the heat-insulating web is fed to the wrapping section, wherein the wet band has a waveform continuing along the longitudinal direction of the heat-insulating web.

The wet band of the heat-insulating web dissolves the binder contained in the heat-insulating web, thereby forming an adhesive for bonding the extrusion-molded article, or in other words, a streak-like adhesive region. When the extrusion-molded article is wrapped in the heat-insulating web so that the fuel rod is formed, the streak-like adhesive region bonds the extrusion-molded article and the heat-insulating web together. The wet band, namely the streak-like adhesive region extends circumferentially relative to the extrusion-molded article, crossing the axial grooves of the extrusion-molded article, and therefore securely bonds the extrusion-molded article and the heat-insulating web together and increases the bonding strength between them. This allows the wet band to be formed with a small amount of the solvent. Thus, the hardness of the outer surface of the extrusion-molded article is sufficiently maintained, which ensures that the heat-source chip obtained from the heat-source rod has burning characteristics required.

Specifically, the solvent spout apparatus can include a vibrator disposed above the web path and having a vibrating member which vibrates transversely relative to the web path; a nozzle attached to the vibrating member, for spouting the solvent to the heat-insulating web; and a supply source for supplying the solvent to the nozzle. Desirably, the vibrator is an air vibrator capable of regulating the amplitude and frequency of vibration of the vibrating member, independently.

Further, the nozzle is a flexible nozzle attached to the vibrating member to extend across the vibrating member, and the flexible nozzle has an end which reciprocates transversely relative to the web path due to the vibration of the vibrating member.

When the heat-insulating web is fed along the web path, the nozzle spouts the solvent onto one side of the heat-insulating web, reciprocating widthways relative to the heat-insulating web, due to the vibration of the vibrating member of the vibrator. By this, the above-mentioned wet band is formed on the heat-insulating web. The amplitude and wavelength of the wet band are determined by the frequency and amplitude of vibration of the vibrating member and the traveling speed of the heat-insulating web.

The waveform wet band is easily formed by combining the traveling of the heat-insulating web and the vibration of the vibrating member. The use of the flexible nozzle facilitates the connection between a pipe extending from the solvent supply source and the flexible nozzle.

The above-described manufacturing machine can further comprise a feed path for feeding a paper web to the wrapping section, where the paper web envelops the extrusion-molded article with the heat-insulating web therein.

The present invention further provides a method of manufacturing a heat-source rod, which method comprises a first step of feeding a rod-like extrusion-molded article made from a combustible material with a plurality of axial grooves in a cylindrical surface thereof and a heat-insulating web made of heat-insulating fiber bound by a binder, to a wrapping section, and placing the extrusion-molded article on one side of the heat-insulating web; a second step of wrapping the extrusion-molded article in the heat-insulating web, thereby forming a heat-source rod, while the heat-insulating web and the extrusion-molded article are passing through the wrapping section; and a third step of spouting a solvent for dissolving the binder onto said side of the heat-insulating web in the process of the heat-insulating web being fed to the wrapping section, thereby forming a wet band of the solvent on said side of the heat-insulating web, where the wet band has a waveform continuing along the longitudinal direction of the heat-insulating web.

The third step can use a nozzle for spouting the solvent to the heat-insulating web, where an end of the nozzle reciprocates transversely relative to the heat-insulating web when the heat-insulating web is fed to the wrapping section. The first step can further include feeding a paper web to the wrapping section, where the paper web envelops the extrusion-molded article with the heat-insulating web therein.

BRIEF DESCRIPTION OF THE DRAWINGS

FIG. 5 A graph comparing an example of heat-source chip according to the present invention and comparative examples of heat-source chip with respect to the fuel core's resistance to push-in.

FIG. 6 A diagram showing an example of a measurement apparatus for measuring the resistance to push-in.

FIG. 9 A graph comparing two examples of heat-source chip according to the present invention with respect to the fuel core's resistance to push-in.

BEST MODE OF CARRYING OUT THE INVENTION

Figure 1:
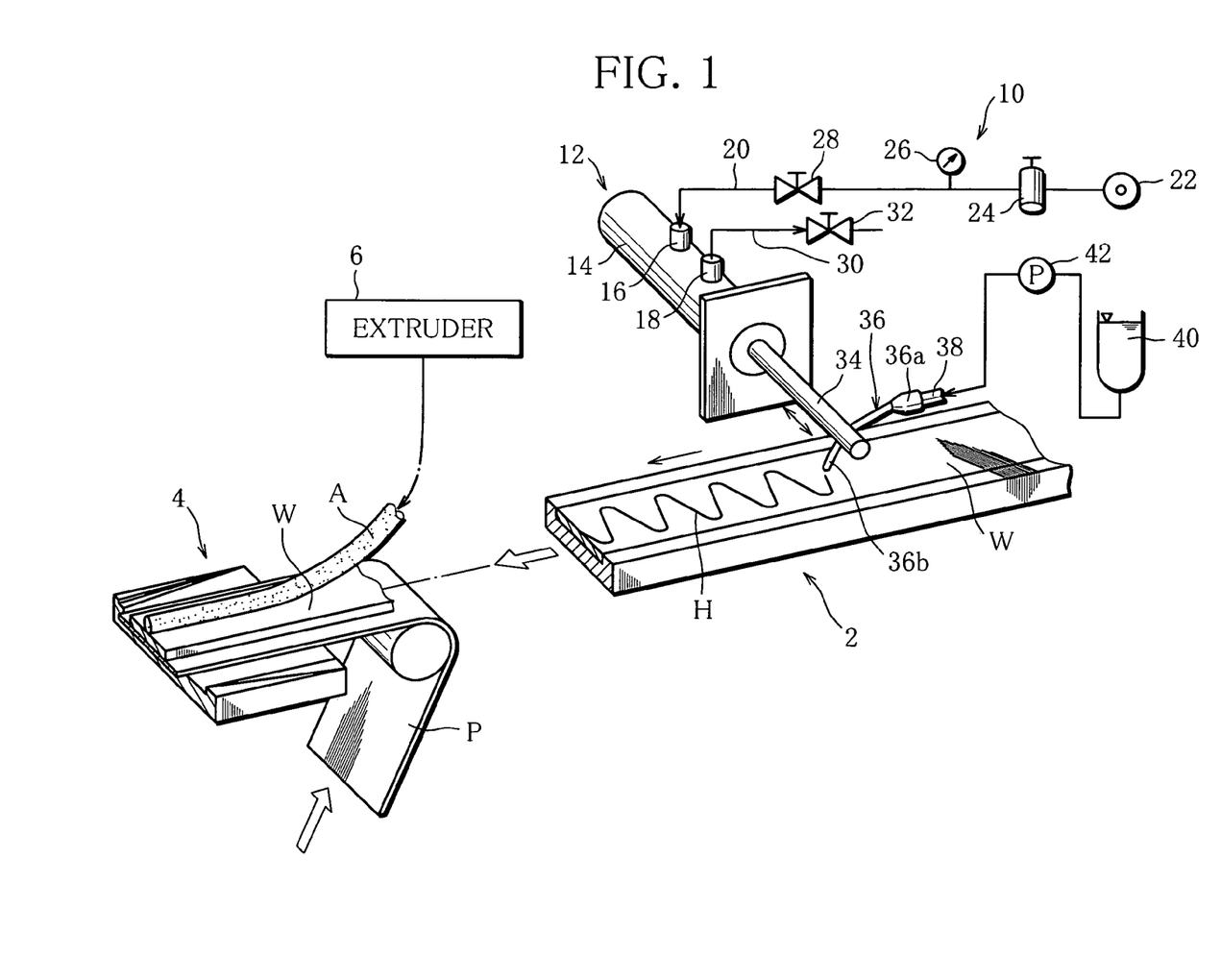
FIG. 1 A diagram schematically showing a partial structure of an embodiment of manufacturing machine.

A manufacturing machine for manufacturing a heat-source rod shown in FIG. 1 has a web path 2. The web path 2 extends to near a wrapping section 4 to feed a heat-insulating web W to the wrapping section 4. The heat-insulating web W is made of unwoven glass-fiber fabric containing a binder such as pectin for binding the glass fiber, and unwound from a web roll (not shown) and fed along the web path 2.

To the wrapping section 4, a rod-like extrusion-molded article A and a paper web P are fed in addition to the heat-insulating web W. At an inlet end of the wrapping section 4, the heat-insulating web W and the extrusion-molded article A are laid on the paper web P in this order.

The extrusion-molded article A is molded from a combustible mixture by an extruder 6, and fed to the wrapping section 4 along a predetermined guide path. Specifically, the mixture comprises carbon powder as a fuel, a combustion regulator, tobacco powder, a binder, water, etc., and obtained by mixing these materials. The combustion regulator includes any of graphite, calcium carbonate, sodium carbonate and the like, or a combination of such substances. The binder includes any of ammonium alginate, methylcellulose, guar gum, pectin and the like, or a combination of such substances.

Figure 2:
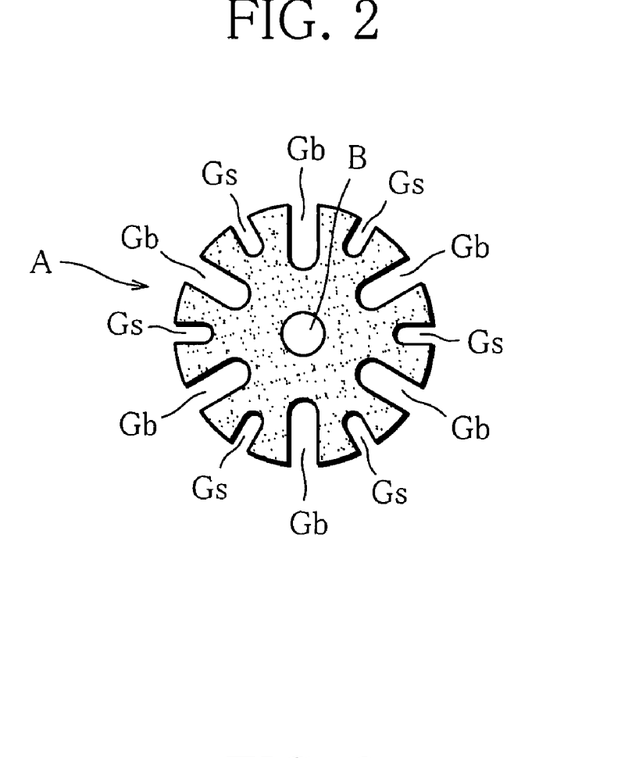
FIG. 2 A transverse cross-sectional view of an extrusion-molded article used for forming a heat-source rod.

FIG. 2 shows a cross section of the extrusion-molded article A. The extrusion-molded article A has a through-hole B formed in the center thereof, and 6 axial grooves Gb and 6 axial grooves Gs formed in the cylindrical surface thereof. The axial grooves Gb and axial grooves Gs are alternately arranged at fixed intervals in the circumferential direction of the extrusion-molded article A. As clear from FIG. 2, the width of the axial groove Gb is greater than the width of the axial groove Gs, and the depth of the axial groove Gb is greater than the depth of the axial groove Gs.

The extrusion-molded article A has a diameter of 3 to 5 mm, for example, and the circumference of the extrusion-molded article A is virtually the same as the width of the heat-insulating web W. Thus, the heat-insulating web W can completely envelop the extrusion-molded article A. Meanwhile, the paper web P has a width greater than the circumference of the heat-insulating web W enveloping the extrusion-molded article A in the form of a tube. When the paper web P is wrapped around the tubular heat-insulating web W, the opposite side edges of the paper web P overlap with a lap glue as an adhesive between.

Figure 3:
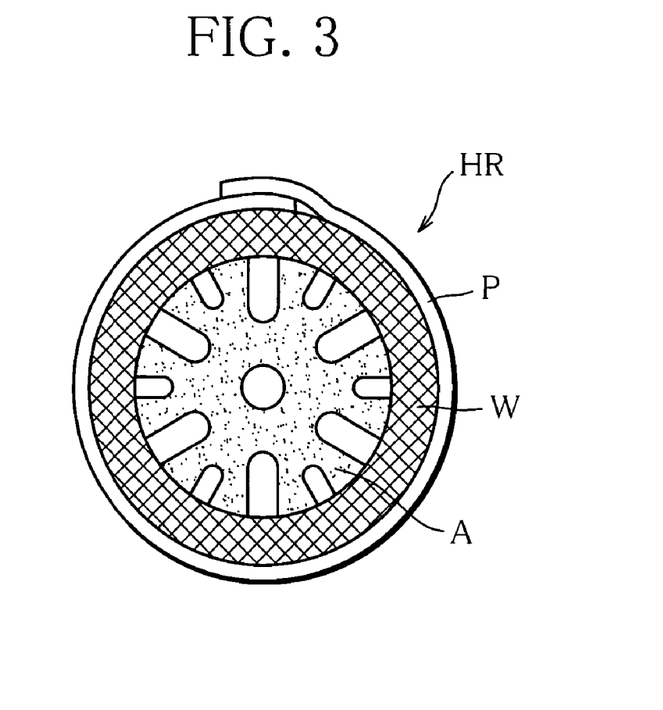
FIG. 3 A diagram showing an end face of a heat-source rod (heat-source chip).

The wrapping section 4 has a similar structure to the wrapping section of a cigarette manufacturing machine. Thus, while the extrusion-molded article A and heat-insulating web W are passing through the wrapping section 4 with the paper web P, the extrusion-molded article A is wrapped in the heat-insulating web W and paper web P as shown in FIG. 3, so that a heat-source rod HR is formed.

Then, in a cutting section (not shown) disposed downstream of the wrapping section 4, the heat-source rod HR is cut into a specified length, so that carbon-based heat-source chips HC are obtained.

Figure 4:
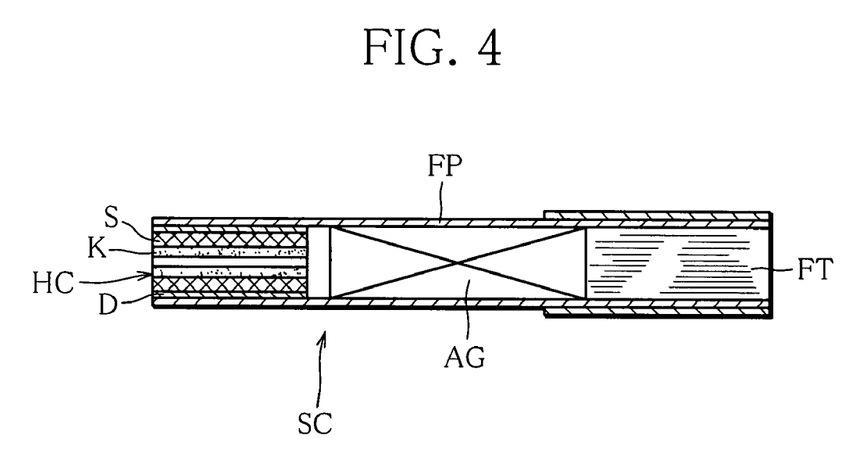
FIG. 4 A longitudinal cross-sectional view of a substitute smoking article including a heat-source chip.

FIG. 4 shows a cigarette-type substitute smoking article SC. The substitute smoking article SC comprises a heat-source chip HC, an aerosol generator (tobacco leaves) AG, and a mouth piece (filter) FT, where the chip, generator and piece are arranged in a line along the axial direction of the substitute smoking article SC.

When the substitute smoking article SC of FIG. 4 is smoked, the heat-source chip HC is ignited. Heat generated from the heat-source chip HC heats the aerosol generator AG, so that a smoke-like aerosol is generated from the aerosol generator AG. Such aerosol is drawn into the smoker's mouth through the mouth piece FT.

In manufacturing the heat-source rod HR, in order to securely bond the extrusion-molded article A and the heat-insulating web W together, the manufacturing machine further comprises a solvent spout apparatus 10 as shown in FIG. 1. The spout apparatus 10 spouts a solvent for dissolving the binder contained in the heat-insulting web W, i.e., water to the heat-insulating web W before the heat-insulating web is fed to the wrapping section 4.

Specifically, the spout apparatus 10 includes a linear air vibrator 12, and the linear vibrator 12 is disposed above the web path 2. The air vibrator 12 comprises a cylindrical casing 14 and a piston (not shown) fitted into the casing 14, and the piston can reciprocate in the casing 14, along the axial direction thereof, namely, along the direction perpendicular to the web path 2.

The casing 14 has an inlet 16 and an outlet 16 at the outer surface thereof. The inlet 16 is connected with a compressed-air supply source 22 by a supply pipe 20. In the supply pipe 20, a pressure regulator 24, a pressure gauge 26 and a needle valve 28 are inserted in this order from the supply source 22 side. From the outlet 18 extends an air discharge pipe 30, and the air discharge pipe 30 has an end which opens into the atmosphere. Also in the air discharge pipe 30, a needle valve 32 is inserted.

By compressed air being supplied from the supply source 22 into the air vibrator 12 through the inlet 16 and discharged from the air vibrator 12 through the outlet 18, the piston reciprocates along one direction, or in other words, vibrates. The frequency and amplitude of vibration of the piston is determined by the pressure of the compressed air supplied to the inlet 16 and the discharge rate of the compressed air discharged from the outlet 18. Thus, the frequency and amplitude of vibration of the piston can be regulated independently, by means of the pressure regulator 24 and the needle valves 28, 32.

A vibrating rod 34 is connected to the piston of the air vibrator 12. The vibrating rod 34 protrudes from the air vibrator 12 and extends across the web path 2, above the web path 2.

A flexible nozzle 36 is attached to the vibrating rod 34. The flexible nozzle 36 has a distal end directed toward the heat-insulating web W on the web path 2. From the proximal end of the flexible nozzle 36, a water supply pipe 38 extends, and the water supply pipe 38 is connected with a water tank 40. In the water pipe 38, a rate regulating pump 42 such as a gear pump is inserted. The rate regulating pump 42 can draw in water from the water tank 40 and spout the drawn-in water through the flexible nozzle 36 onto the insulating web W at a specified discharge rate.

More specifically, the flexible nozzle 36 comprises a hub part 36a at the proximal end thereof, in which the water supply pipe 38 is fitted, and a needle part 36b which extends integrally from the hub part 36a. The needle part 36b has flexibility. Meanwhile, the vibrating rod 43 has a hole near the distal end thereof, and the hole extends through the vibrating rod 36, along a diameter of the vibrating rod 36. The flexible nozzle 36 is attached to the vibrating rod 34 in the manner that the needle part 36b of the flexible nozzle 36 is passed through the though-hole from above.

As the air vibrator 12 is driven so that the vibrating rod 34 vibrates, the distal end of the flexible nozzle 36 reciprocates widthways relative to the insulating web W, following the vibration of the vibrating rod 34, with the needle part 36b bent. In spite of the bending of the needle part 36b, the flexible nozzle 36 stably receives water from the rate regulating pump 42 at a fixed rate. Thus, the needle part 36b of the flexible nozzle 36 easily embodies a water supply path from the rate regulating pump 42 to the distal end of the flexible nozzle 36, although the distal end of the flexible nozzle 36 reciprocates due to the vibration of the vibrating rod 34.

Even when the amplitude or frequency of vibration of the vibrating rod 34 is changed, the needle part 36b easily follows the change due to its flexibility.

The flexible nozzle 36 also functions as a stopper for preventing the vibrating rod 34 from rotating about the axis with the piston of the air vibrator 12.

When the heat-insulating web W is fed to the wrapping section 4 along the web path 2, the vibrating rod 34 is vibrated and water is spouted from the distal end of the flexible nozzle 36 toward the heat-insulating web W. The water spouted this way penetrates into the upper surface of the heat-insulating web W, thereby forming a wet band H on the heat-insulating web W as shown in FIG. 1. The wet band H describes a continuous waveform, or in other words, a sine curve, along the longitudinal direction of the heat-insulating web W.

The wet band H dissolves the binder such as pectin contained in the insulating web W, thereby forming a so-called adhesive application region. The amplitude of the wet band H is determined by the amplitude of vibration of the vibrating rod 34, and the wavelength of the wet band H is determined by the traveling speed of the heat-insulating web W and the frequency of vibration of the vibrating rod 34.

The insulating web W with the wet band H, namely the adhesive application region formed is fed to the wrapping section 4 with the paper web P. Also the extrusion-molded article A is fed to the wrapping section 4, where the extrusion-molded article A is placed on the paper web P with the heat-insulating web W between. When the extrusion-molded article A, heat-insulating web W and paper web P pass through the wrapping section 4, the extrusion-molded article A is continuously wrapped in the heat-insulating web W and paper web P, so that a heat-source rod HR is formed.

At this stage, since the heat-insulating web W has the wet band H, namely the adhesive application region, the heat-insulating web W and the extrusion-molded article A are bonded together by the adhesive. Since the wet band H extends circumferentially relative to the extrusion-molded article A, the wet band H securely bonds the extrusion-molded article A and the heat-insulating web W together, so that the strength of bonding between the extrusion-molded article A and the heat-insulating web W is high.

Thus, also in the heat-source chip HC obtained by cutting the heat-source rod HR, the fuel core K and the heat-insulating sheath S are firmly bonded. Thus, after the substitute smoking article including the heat-source chip HC is produced, even if a shock is applied to the substitute smoking article SC in the axial direction during transportation or when it is held in a consumer's hand, the fuel core K does not shift, or move axially relative to the heat-insulating sheath S.

Since the strength of bonding between the fuel core K and the heat-insulating sheath S is high for the reason mentioned above, the wet band H can be formed with a small amount of spouted water. This prevents the phenomenon that water in the wet band H penetrates into the extrusion-molded article A excessively, and therefore prevents a decrease in the hardness of the outer surface of the extrusion-molded article A. Consequently, on the occasions such that the heat-source rod HR is formed or the heat-source rod HR is cut, the axial grooves Gb, Gs of the extrusion-molded article A are not deformed or little deformed. Thus, the axial grooves Gb, Gs stably maintain the groove shape which they took immediately after molding of the extruded-molded article A. Accordingly, the heat-source chip HC can have desired burning characteristics.

Figure 5:
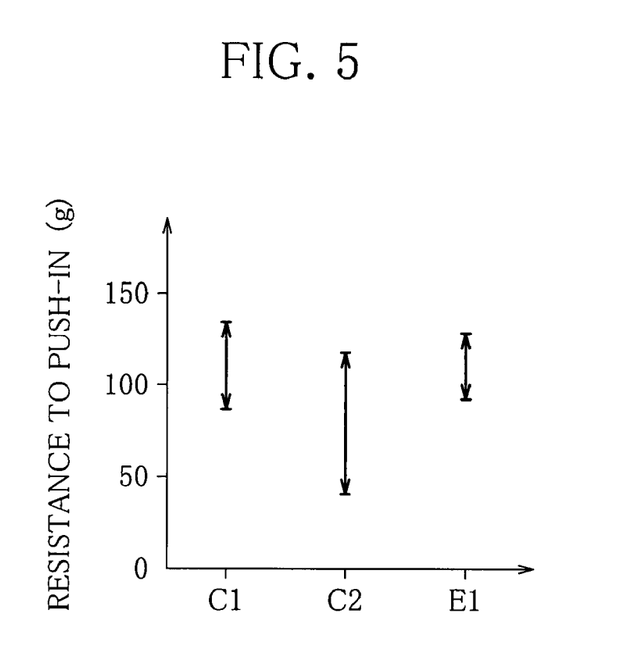

FIG. 5 shows the result of measurement of bonding strength between the fuel core K and the heat-insulating sheath S, where the equal numbers of examples E1 of the heat-source chip HC according to the present invention, comparative examples C1 and comparative examples C2 of heat-source chip were prepared and measured. Here, as a quantity representing the bonding strength, the resistance of the fuel core K to push-in relative to the heat-insulating sheath S was measured.

In the manufacture of the heat-source rod HR for obtaining examples E1 of the heat-source chip HC, the wet band H was formed by using 14 ml of water per 25 m of the heat-insulating web W. Meanwhile, in the manufacture of heat-source rods for obtaining comparative examples C1 and comparative examples C2 of heat-source chip, linear wet bands were formed by using 28 ml and 14 ml of water per 25 m of the heat-insulating web W, respectively. In the manufacture of any of example E1 and comparative examples C1, C2 of heat-source chip, an extrusion-molded article of cross section shown in FIG. 2 was cut into 12 mm, and the conditions of manufacture of the extrusion-molded article were the same.

Figure 6:
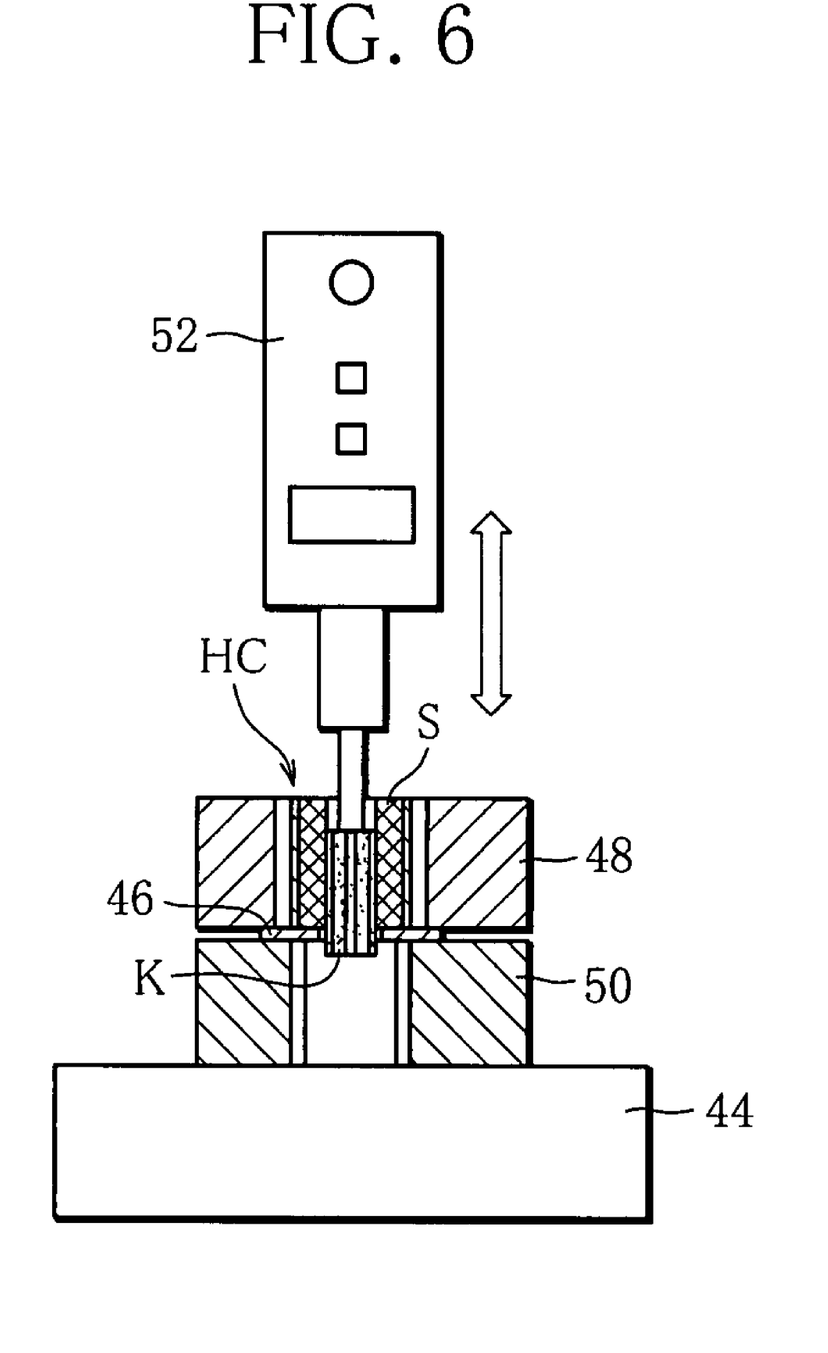

FIG. 6 shows a measurement apparatus with which the result of measurement shown in FIG. 5 was obtained.

The measurement apparatus has a base 44, and hollow cylindrical members 48, 50 forming a pair are arranged vertically on the base 44. Between the cylindrical members 48, 50, an annular disk 46 is interposed. The inner diameters of the cylindrical members 48, 50 are greater than the outer diameter of the heat-source chip HC, and the inner diameter of the disk 46 is greater than the outer diameter of the fuel core K of the heat-source chip HC but smaller than the outer diameter of the heat-source chip HC. The measurement apparatus further comprises a force gauge 52 disposed above the cylindrical members 48, 50, where the force gauge 52 can move up and down.

As shown in FIG. 6, the heat-source chip as a test piece is inserted into the upper cylindrical member 48 and placed on the disk 46. In this state, the force gauge 52 pushes onto the fuel core K of the heat-source chip HC downward at the rate of 1.5 mm/s, where the maximum of the readings shown on the force gauge 52 is obtained as the resistance of the fuel core K to push-in (bonding strength between the fuel core K and the insulating sheath S).

As clear from FIG. 5, examples E1 (14 ml) of heat-source chip according to the present invention have a greater resistance to push-in, compared with comparative examples C2 (14 ml) of heat-source chip, and the resistance to push-in of examples E1 is at a similar level to the resistance to push-in of comparative examples C1 (28 ml) of heat-source chip. This means that in the manufacture of the heat-source rod for obtaining examples E1 of heat-source chip, the same resistance to push-in can be ensured with a smaller amount of water spouted onto the heat-insulating web W, as compared with the manufacture of the heat-source rod for obtaining comparative examples C1 of heat-source chip.

Further, regarding the equal numbers of examples E1 and comparative examples C1 of heat-source chip, the resistance to drawing was measured as a quantity representing the degree of deformation of the axial grooves of the heat-source chip. The result of measurement is shown in terms of cumulative frequency in FIG. 7.

Figure 7:
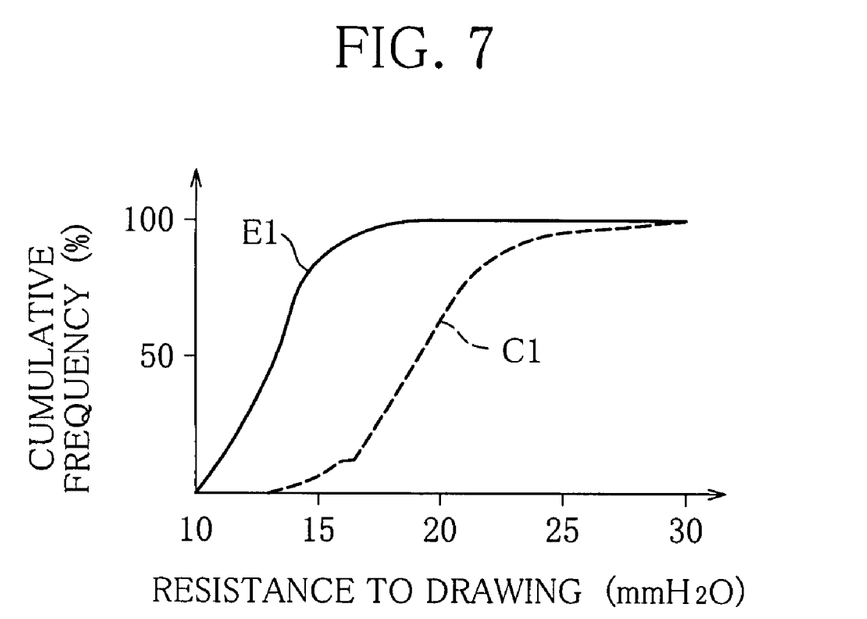
FIG. 7 A graph comparing an example of heat-source chip according to the present invention and comparative examples of heat-source chip in respect of the resistance to drawing.
Figure 8:
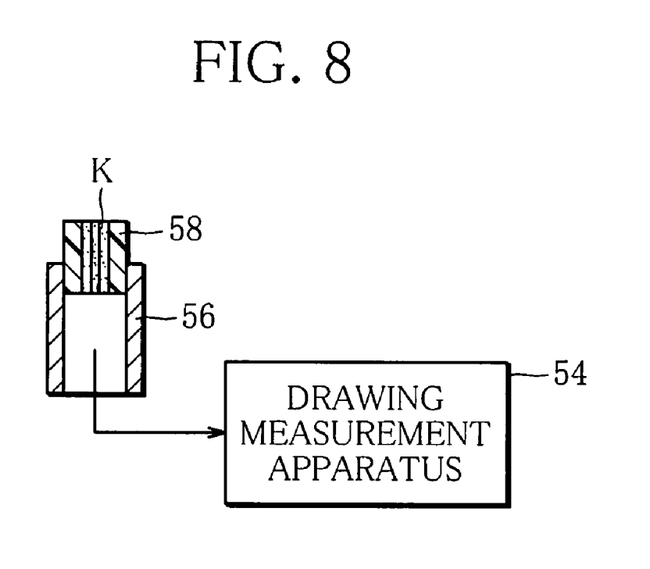
FIG. 8 A diagram for explaining how to measure the resistance to drawing.

The result of measurement in FIG. 7 was obtained using a drawing measurement apparatus 54 shown in FIG. 8. The drawing measurement apparatus 54 includes a suction pipe 56, and the suction pipe 56 has an inlet into which a test tube 58 can be fitted. The test tube 58 holds a to-be-measured fuel core K air-tightly inserted therein. After the test tube 38 is fitted into the inlet of the suction pipe 56, the drawing measurement apparatus 54 draws in air through the test tube 58 at the rate of 17.5 ml/s, and the resistance to drawing in the fuel core K (heat-source chip HC) is measured.

As clear from FIG. 7, regarding examples E1 (14 ml) of heat-source chip according to the present invention, the proportion of those which have a small resistance to drawing is larger, as compared with comparative examples C1 (28 ml) of heat-source chip. This indicates that in examples E1 of heat-source chip according to the present invention, the axial grooves of the fuel core K well maintain the shape imparted at the time of extrusion molding. Thus, examples E1 of heat-source chip according to the present invention can have desired burning characteristics, which leads to a great improvement in the quality of the substitute smoking article SC.

Figure 9:
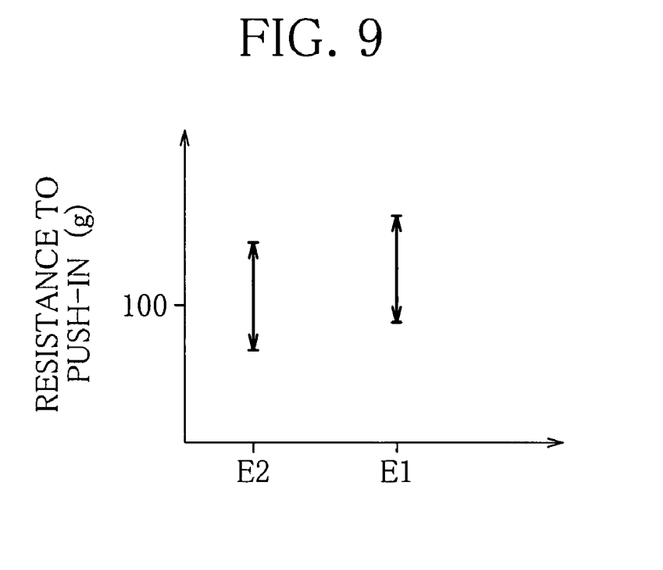
Figure 10:
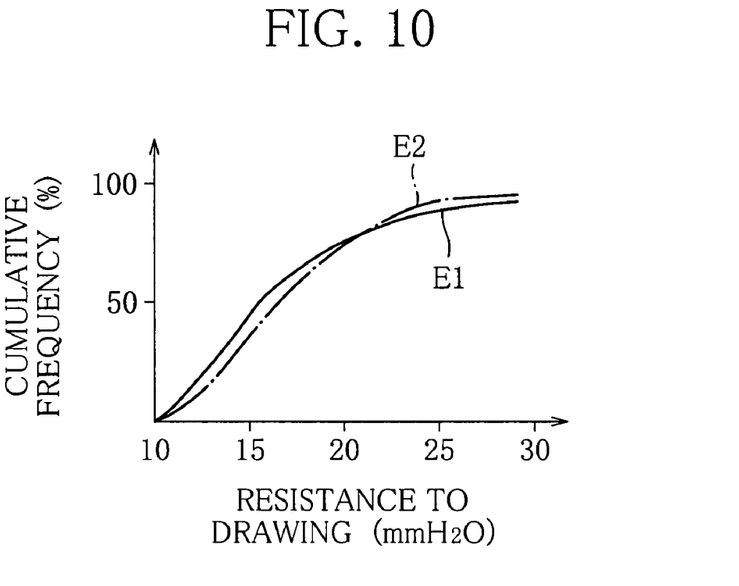
FIG. 10 A graph comparing two examples of heat-source chip according to the present invention with respect to the resistance to drawing.

FIGS. 9 and 10 show the result of comparison between examples E1 and E2 of heat-source chip according to the present invention, with respect to the resistance of the fuel core K to push-in and the degree of deformation of the axial grooves (resistance to drawing).

The heat-source rods for obtaining examples E1 and E2 of heat-source chip are manufactured using different flexible nozzles. Specifically, the flexible nozzle 36 used in the manufacture of the heat-source rod for examples E1 is 0.61 mm in inner diameter, while the flexible nozzle 36 used in the manufacture of the heat-source rod for examples E2 is 0.25 mm in inner diameter. Thus, the width of the wet band in examples E1 is greater than the width of the wet band in examples E2.

As clear from FIG. 9, in examples E1 of heat-source chip, the resistance to push-in is relatively high as compared with examples E2. Meanwhile, as shown in FIG. 10, with respect to the resistance to drawing, almost no difference is seen between examples E1 and examples E2 of heat-source chip. This means that provided that the amount of water spouted is the same, the resistance to push-in in examples E1, E2 is affected by the inner diameter of the flexible nozzle 36, or in other words, the width of the wet band H, while with respect to the resistance to drawing (i.e., degree of deformation of the axial grooves), no difference is produced between examples E1 and E2.

The present invention is not restricted to the above-described embodiment. Various modifications can be made to it.

For example, the spout apparatus 10 can use different types of vibrators other than the air vibrator 12, and can include a hard nozzle substituting for the flexible nozzle 36 and a flexible coupling for connecting the hard nozzle to the water supply pipe.

Further, the solvent spouted onto the heat-insulating web is not restricted to water, but selected appropriately according to the type of the binder contained in the heat-insulating web.

The invention claimed is:

1. A manufacturing machine for manufacturing a heat-source rod, comprising:
    a web path for feeding a heat-insulating web made of heat-insulating fiber bound by a binder,
    a wrapping section disposed downstream of said web path, for receiving the heat-insulating web from said web path and a rod-like extrusion-molded article made from a combustible material with a plurality of axial grooves in a cylindrical surface thereof on one side of the received heat-insulating web, and continuously wrapping the extrusion-molded article in the heat-insulating web, thereby forming a heat-source rod, while the heat-insulating web and the extrusion-molded article are passing through said wrapping section,
    a solvent spout apparatus for spouting a solvent for dissolving the binder onto said side of the heat-insulating web, thereby forming a wet band of the solvent on said side of the heat-insulating web, before the heat-insulating web is fed to said wrapping section,
    said solvent spout apparatus includes:
    a vibrator disposed above said web path and having a vibrating member which vibrates transversely relative to said web path,
    a nozzle attached to the vibrating member, for spouting the solvent to the heat-insulating web, and
    a supply source for supplying the solvent to the nozzle,
    wherein the wet band has a waveform continuing along the longitudinal direction of the heat-insulating web.

2. The manufacturing machine according to claim 1, wherein
    the vibrator is an air vibrator capable of regulating the amplitude and frequency of vibration of the vibrating member, independently.

3. The manufacturing machine according to claim 1, wherein
    the nozzle is a flexible nozzle attached to the vibrating member to extend across the vibrating member, and the flexible nozzle has an end which reciprocates transversely relative to said web path due to the vibration of the vibrating member.

4. The manufacturing machine according to claim 1, further comprising a feed path for feeding a paper web to said wrapping section, wherein the paper web envelops the extrusion-molded article with the heat-insulating web.

5. A method of manufacturing a heat-source rod, comprising:
    a first step of feeding a rod-like extrusion-molded article made from a combustible material with a plurality of axial grooves in a cylindrical surface thereof and a heat-insulating web of heat-insulating fiber bound by a binder, to a wrapping section, and placing the extrusion-molded article on one side of the heat-insulating web,
    a second step of wrapping the extrusion-molded article in the heat-insulating web, thereby forming a heat-source rod, while the heat-insulating web and the extrusion-molded article are passing through the wrapping section,
    a third step of spouting a solvent for dissolving the binder onto said side of the heat-insulating web in the process of the heat-insulating web being fed to the wrapping section, thereby forming a wet band of the solvent on said side of the heat-insulating web, where the wet band has a waveform continuing along the longitudinal direction of the heat-insulating web,
    wherein the step of spouting the solvent includes:
    providing a vibrator disposed above said web path and having a vibrating member which vibrates transversely relative to said web path,
    attaching a nozzle to the vibrating member, for spouting the solvent to the heat-insulating web, and
    providing a source for supplying the solvent to the nozzle.

6. The manufacturing method according to claim 5, wherein
    said third step uses the nozzle wherein an end of the nozzle reciprocates transversely relative to the heat-insulating web when the heat-insulating web is fed to the wrapping section.

7. The manufacturing method according to claim 6, wherein
    said first step further includes feeding a paper web to the wrapping section, where the paper web envelops the extrusion-molded article with the heat-insulating web therein.

* * * * *